United States Patent [19]

Irvine

[11] Patent Number: 4,864,848
[45] Date of Patent: Sep. 12, 1989

[54] LEAK DETECTION SYSTEM

[75] Inventor: Gerald O. Irvine, Crosby, Minn.

[73] Assignee: Minnesota Automation, Inc., Crosby, Minn.

[21] Appl. No.: 162,185

[22] Filed: Feb. 29, 1988

[51] Int. Cl.[4] .............................................. G01M 3/26
[52] U.S. Cl. ........................................ 73/45.4; 73/49.3
[58] Field of Search .................. 73/49.2, 49.3, 41, 45, 73/45.1, 45.4, 52

[56] References Cited

U.S. PATENT DOCUMENTS

| | | | |
|---|---|---|---|
| 2,999,591 | 9/1961 | Crump | 209/82 |
| 3,038,606 | 6/1962 | Leaver | 209/111.5 |
| 3,094,213 | 6/1963 | Wyman | 209/111.5 |
| 3,133,638 | 5/1964 | Calhoun | 209/82 |
| 3,225,191 | 12/1965 | Calhoun | 250/43.5 |
| 3,232,429 | 2/1966 | Norwich | 209/111.7 |
| 3,509,996 | 5/1970 | Malik | 209/111.7 |
| 3,683,677 | 8/1972 | Harris | 73/49.2 |
| 3,805,593 | 4/1974 | Sandoz | 73/49.2 |
| 3,835,698 | 9/1974 | Zappia | 73/94 |
| 4,019,370 | 4/1977 | Allocco, Jr. | 73/45.1 |
| 4,024,956 | 5/1977 | Cassidy | 73/49.3 |
| 4,055,252 | 10/1977 | Klamm | 209/74 M |
| 4,390,782 | 6/1983 | Vornfett | 250/223 B |
| 4,697,452 | 10/1987 | Prakken | 73/49.3 |
| 4,756,184 | 7/1988 | Reishus et al. | 73/49.3 |

FOREIGN PATENT DOCUMENTS 230367 7/1987 European Pat. Off. ................ 73/52

OTHER PUBLICATIONS

SKF Norden, Flex-Link Brochure 3527U, 1985.

*Primary Examiner*—Hezron E. Williams
*Attorney, Agent, or Firm*—Anthony G. Eggink

[57] ABSTRACT

The invention provides a leak detection system for filled and sealed pliable containers. The system comprises a continuous squeezing conveyor, a line conveyor and high and low fill level container content detectors located at predetermined positions. The squeezing conveyor moves a stream of containers while placing a predetermined pressure on the containers through a predetermined distance. The line conveyor is disposed adjacent the outlet end of the squeezing conveyor. The line conveyor is synchronized for receiving and transporting the container stream. The high fill level detector is disposed adjacent the squeezing conveyor outlet end. The low fill level detector is disposed adjacent the line conveyor at a predetermined distance downstream the squeezing conveyor outlet end.

19 Claims, 6 Drawing Sheets

LEAK DETECTION SYSTEM

BACKGROUND OF THE INVENTION

This invention relates to a leak detection system and process for detecting and ejecting defective containers. Particularly, this invention relates to a leak detection system for filled and sealed pliable containers.

The leak detection system of this invention is used to test filled and sealed containers or packages for leakage and to automatically eject any defective containers from the product stream. Leaks in plastic molded containers, such as plastic bottles, can result from impurities in the plastic materials or in the molding process of the containers. Typically, leaks can be large, to cause fluid or other product contents to pour from the containers, or the leaks can be small, to cause small quantities of air or product contents to be expelled from the container particularly when placed under pressure.

Due to advances in the manufacture and filling of pliable or plastic containers, wherein the containers are filled and sealed in a continuous process, as well as in the speed of these processes, it has become increasingly necessary to properly test the individual containers for product leakage. Subsequent to the manufacturing, filling and sealing processes, the containers may be stacked or otherwise grouped, and/or packaged, for example, in cardboard boxes. Leaking containers can cause sanitation problems and may cause contamination in the packaged containers. Any such leakage is not desirable, particularly in the food services and pharmaceutical industries. Moreover, leaking containers cause warehousing or storage problems in situations where containers, particularly those having liquid contents, are stacked in vertical layers. Thus, it is desirable to properly test any filled container prior to further packaging.

Most prior art devices and leak detection processes are designed for testing individual product containers or bottles in bath-type operations and, therefore, are not well suited for use in continuous product processing operations. Thus, because of the continuous nature and advancement in these manufacturing processes, most prior art leak detection systems proposed and utilized in the past are not suited for such operations.

The leak detection system of this invention, overcomes the shortcomings and limitations of these prior art devices. particularly, the leak detection system of this invention permits filled and sealed pliable containers to be tested in a continuous operation.

SUMMARY OF THE INVENTION

The device of the present invention is a leak detection system for filled and sealed pliable containers. The system comprises continuous squeezing means, conveyance means, high fill level container content detection means and low fill level container content detection means. The continuous squeezing means moves a stream of containers while placing a predetermined pressure on the containers through a predetermined distance as they are transported towards an outlet end. The conveyance means is disposed adjacent the outlet end of the squeezing means. The conveyance means is synchronized for receiving and transporting the stream of containers for subsequent packaging purposes. The high and low fill level detection means detect product fill level displacements caused by leaks in the containers. The high fill level detection means is disposed adjacent the outlet end of the squeezing means. The low fill level detection means is disposed adjacent the conveyance means at a predetermined distance downstream the squeezing means outlet end.

The squeezing means is comprised of opposing and revolving endless flexible belts or chains adjustably spaced at a predetermined distance so that as predetermined pressure is applied to the container stream. The predetermined spacing distance is dependent upon the diameter and construction of the pliable containers. The squeezing means is adjustable about three separate axis for alignment and to vary the predetermined pressure. The continuous squeezing means is preferably constructed and arranged in an overhead configuration having vertical and horizontal sections. In the preferred embodiment, the flexible belts are comprised of a plurality of interconnected links and further have a plurality of outwardly extending cleat members which grasp the containers. The squeezing means moves the containers at a predetermined speed and has a length sufficient to apply the predetermined pressure on the containers for a predetermined period of time at the predetermined speed.

The conveyance means is preferably a line conveyor. The leak detection system further comprises synchronized drive means operative on the squeezing means and the conveyance means. The high fill level detection means is preferably located adjacent the outlet end of the squeezing means. The high fill level and low fill level detection means each consist of a photo eye, proximity switch, electromagnetic beam detector, ultrasound detector or similar structures as known in the art, depending upon the particular container structure being tested as well as the nature of the product contents.

The leak detection system further comprises high fill level and low fill level container reject means disposed downstream from the high level and low level detection means, respectively. The reject means are disposed adjacent the conveyance means for removing containers therefrom in response to signals from the high fill level and low fill level detection means. The high level and low level reject means comprise pneumatic cylinders mounted adjacent and perpendicular to the line of travel of the conveyance means. A container discharge chute and receptacle are preferably disposed adjacent the conveyance means and opposite the high level and low level reject means to guide and hold rejected containers.

Also provided by this invention are methods to detect product leakage in pliable containers in a continuous process.

These and other benefits of this invention will become clear from the following description, by reference to the drawings.

DESCRIPTION OF THE PREFERRED EMBODIMENTS

Figure 1:
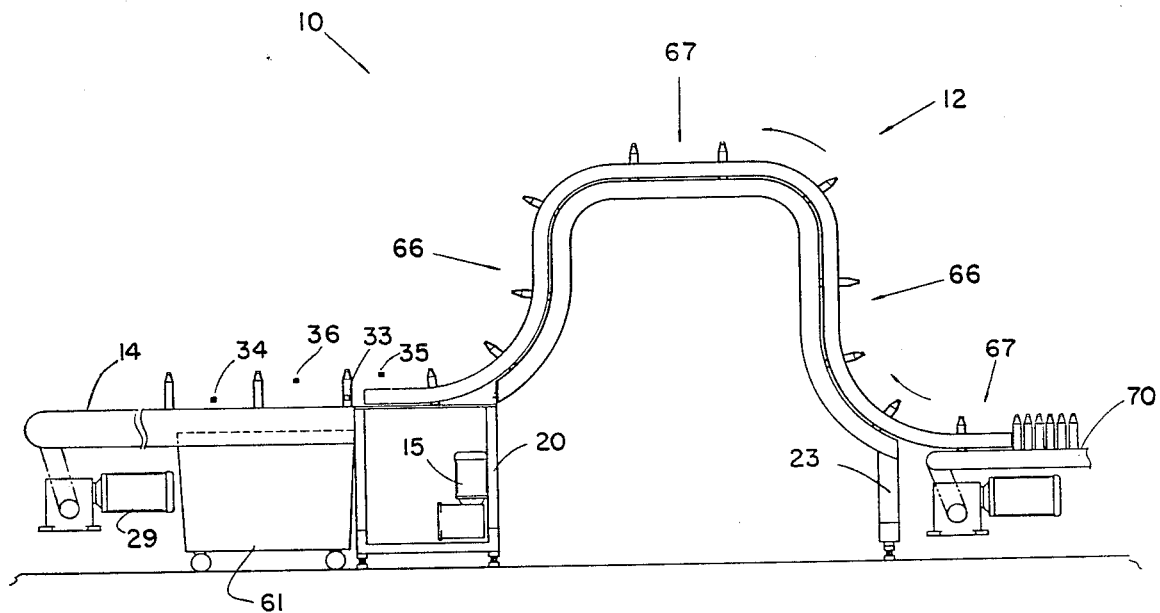
FIG. 1 is a schematic top plan view of the leak detection system of this invention shown in use with a continuous product processing operation.
Figure 2:
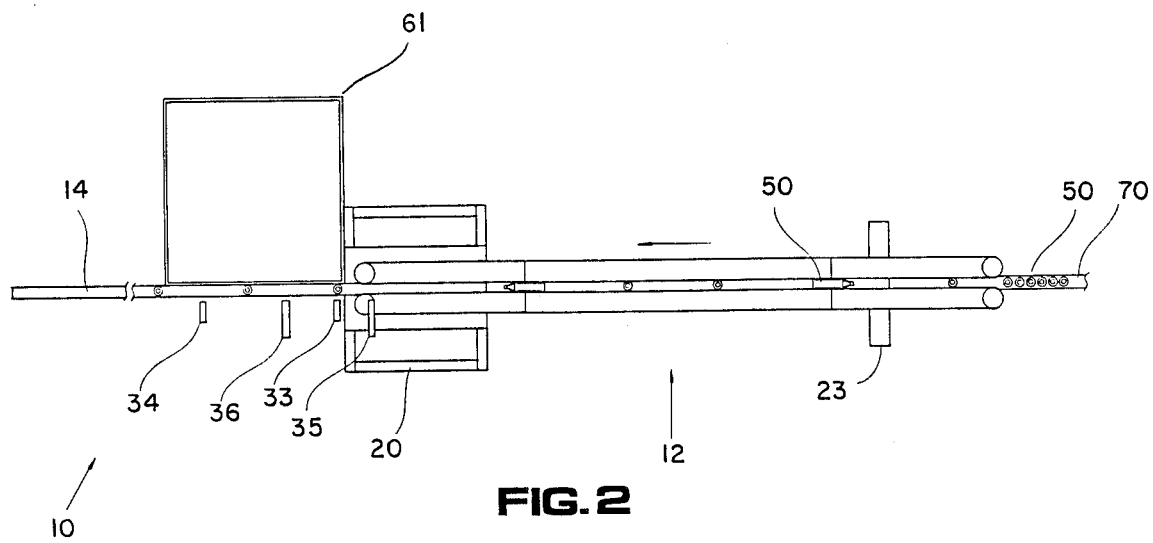
FIG. 2 is a schematic lateral plan view of the leak detection system shown in FIG. 1.

FIGS. 1 and 2 illustrate the leak detection system 10 which is designed to be incorporated in a continuous product processing operation. The leak detection system 10 has a compressive transfer mechanism 12 and a take-away conveyor 14. The filled and sealed pliable containers 50 enter the leak detection system 10 on an infeed conveyor 70 or other suitable conveyance means which is part of the processing operation and which transfers the individual containers 50 to the compressive transfer mechanism 12. The pliable containers are typically filled with liquid or fluid contents and which may or may not have a gas filled headspace. The containers 50 are typically composed of plastic or a similarly pliable materials. The containers are transported by the compressive transfer mechanism 12 and subsequently placed onto the take-away or line conveyor 14.

Importantly, the line conveyor 14 has a pair of high and low fill level detectors 35 and 36 placed adjacent thereto at predetermined locations. The detectors 35 and 36 measure fill level displacements in the pliable containers or bottles 50 to detect any possible leaks. Working in conjunction with the detectors 35 and 36 are a pair of rejectors 33 and 34, respectively, which are timed to push the rejected bottles out of the product flow stream. Importantly, the high fill level detector 35 is placed adjacent the compressive transfer mechanism 12, and preferably, within a range of its end. The low fill level detector 36 is located downstream and adjacent the line conveyor 14. Preferably, the high liquid level detector 35 and the low liquid level detector 36 are of the gamma-ray type detection systems, as known in the art. Alternatively, they may be photo-eyes, proximity switches or some other suitable fill level detectors. The high and low level detectors measure the product levels in the containers which have a desirable predetermined level range set by the manufacturer.

The compressive transfer mechanism 12 places a constant predetermined pressure on the exterior of the pliable containers. Containers with relatively small leaks have been found to discharge small amounts of air or liquid contents when squeezed by the compressive transfer mechanism 12. If air or a small quantity of contents are discharged, containers having a headspace will have a higher fill level while being subjected to the external pressure or immediately after the release of the external pressure. And, these high level containers will be detected and rejected by the high level mechanisms. The high level reject mechanisms are therefore desirable for use with containers having a headspace to detect small leaks. Containers with relatively large leaks have been found to discharge larger amounts of contents only or contents and air. If contents are discharged due to a large leak, the containers will have lower fill levels upon release of the external pressure and recovery to their approximate uncompressed shape due to air intake through the leak area. Any low level containers or bottles will be detected and rejected by the low level mechanisms.

The compressive transfer mechanism 12 is adjustable to permit variation of the compressive pressure so as to be operative on a variety of pliable container structures, compositions, and sizes having varying fluid or product contents. Additionally, the container may be completely filled or may have a headspace filled with air or purged with a gas. The construction of the compressive transfer mechanism 12 is preferably a double-sided conveyor having endless belts of a molded rubber material or similar pliable structure, such as polyurethane. The belts preferably have a number of cleat members spaced to engage the opposite sides of the bottles to grip and assist in squeezing the containers during the transfer operation. The compressive transfer mechanism 12 has a support frame 24 preferably with vertical and horizontal sections 66 and 67 which provide an elevated configuration to permit the bottles to be subjected to external pressure for a specified period of time while maximizing line speed and travel distance without increasing required floor space. Such an overhead configuration also allows operator personnel to move about and inspect the detection system by enabling them to walk underneath it without crossovers or similar structures. Alternatively, the configuration may be straight line and level. The support frame 24 is supported at its inlet end by a support structure or legs 23, and at its outlet end by a frame 20.

The system 10 has a drive mechanism 15 for powering the compressive transfer mechanism 12, and a synchronized drive mechanism 29 for powering the line conveyor 14. The operation of the conveyors 12 and 14, the detectors 35 and 36, and the rejectors 33 and 34 are synchronized for the particular type, size, speed and spacing of the containers. Additionally, a reject container hopper 61 is disposed adjacent the line conveyor 14 and opposite the rejectors 33 and 34.

Figure 3:
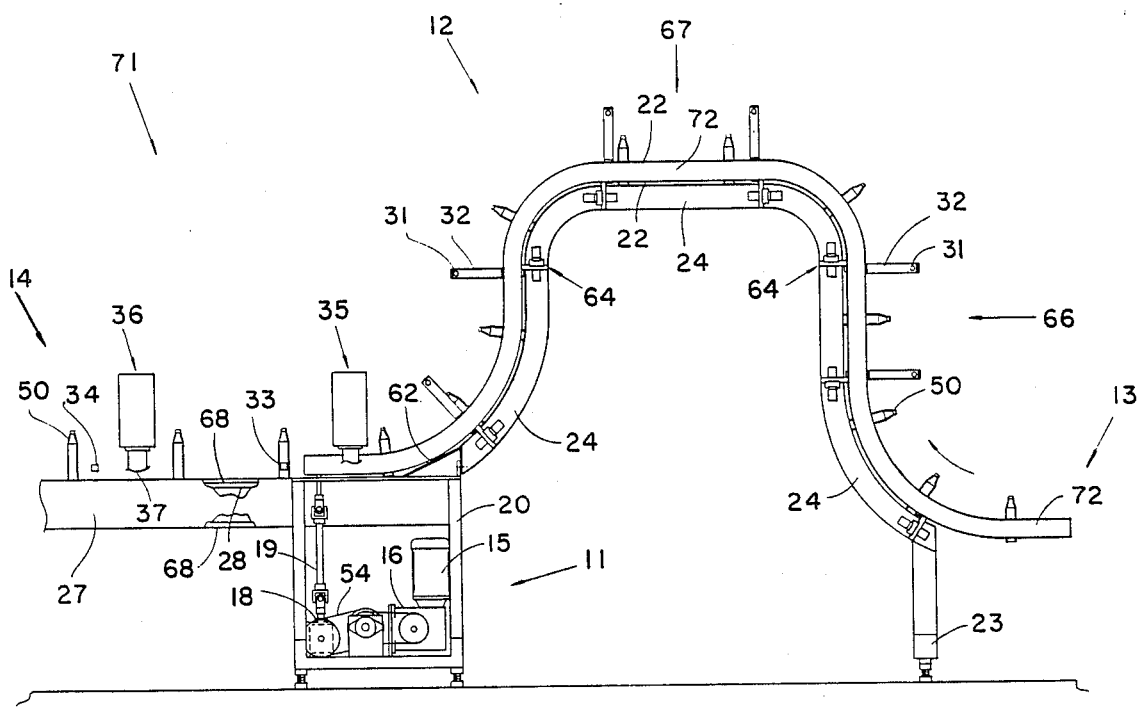
FIG. 3 is a schematic lateral plan view of the preferred embodiment of the leak detection system of this invention.
Figure 5:
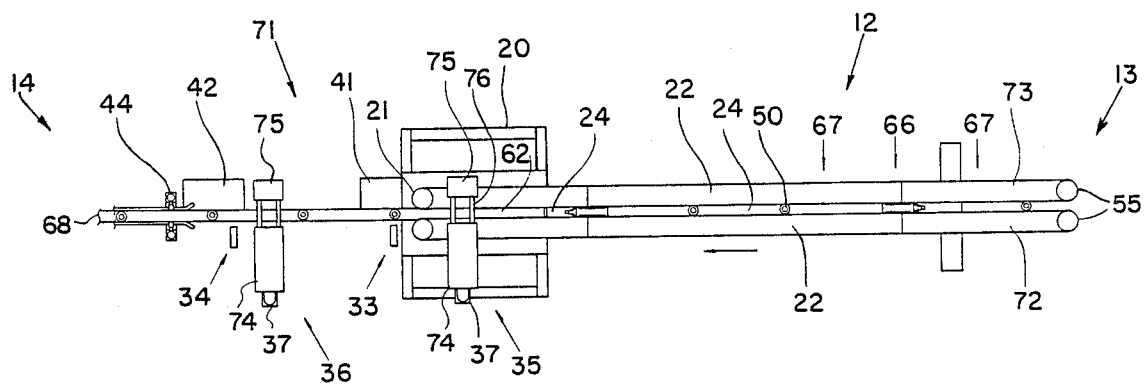
FIG. 5 is a schematic top plan view of the leak detection system embodiment shown in FIG. 3.

FIGS. 3 and 5 show the preferred embodiment 71 of the leak detector system from a side and top view respectively. The system 71 has a main frame and drive mechanism 11, a compressive transfer conveyor 12, and infeed section 13 and an outfeed section 14. The infeed section 13 is communicatively connected to a continuous input of filled and sealed pliable containers. The compressive transfer conveyor 12 is synchronized to receive containers at the inlet section 13 from an infeed conveyor (not shown) or the like. The compressive transfer conveyor 12 then grasps and applies a predetermined pressure on the containers while moving them towards the outlet section 14. The conveyor 12 is preferably run at a slightly faster speed than that of the infeed conveyor to more uniformly space or group the containers 50.

The compressive transfer conveyor 12 is preferably a Flex-Link, side transfer, materials handling conveyor manufactured by SKF Norden, Goteborg, Sweden. The conveyor 12 has a support frame 24 and a pair of conveyor beams 22. The elevating frame 24 provides adjustable support for the conveyor beams 22. The support frame 24 is supported at the inlet section end 13 by a support leg 23 and at the outfeed section 14 by the mainframe and drive mechanism 11. The support frame 24 is in an overhead configuration having both horizontal and vertical sections 67 and 66 to provide improved access by personnel and to maximize container transfer distance and, therefore, compression time, while minimizing production space. Additionally, nozzle holders 32 having nozzles 31 are disposed about the side transfer conveyor 12. The nozzles 30 spray a fine mist of water or a suitable solvent on the transported containers for sanitation purposes. Leaky containers may expel or drip product contents onto the side transfer conveyor 12 and adjoining containers while being compressed. The mist from nozzles 30 keeps both the conveyor 12 and the containers 50 free from any such discharged product contents.

Figure 7:
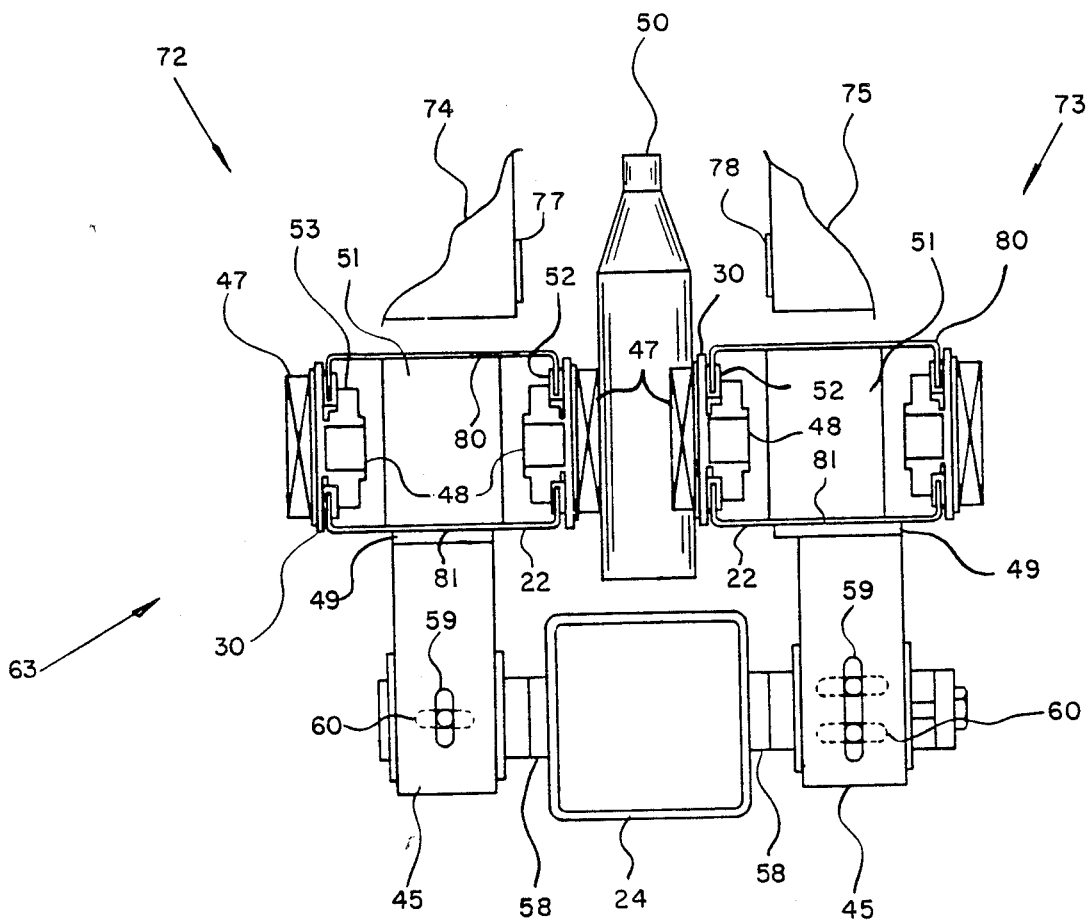
FIG. 7 is a frontal view of a container disposed in the continuous squeezing means of the leak detection system.
Figure 9:
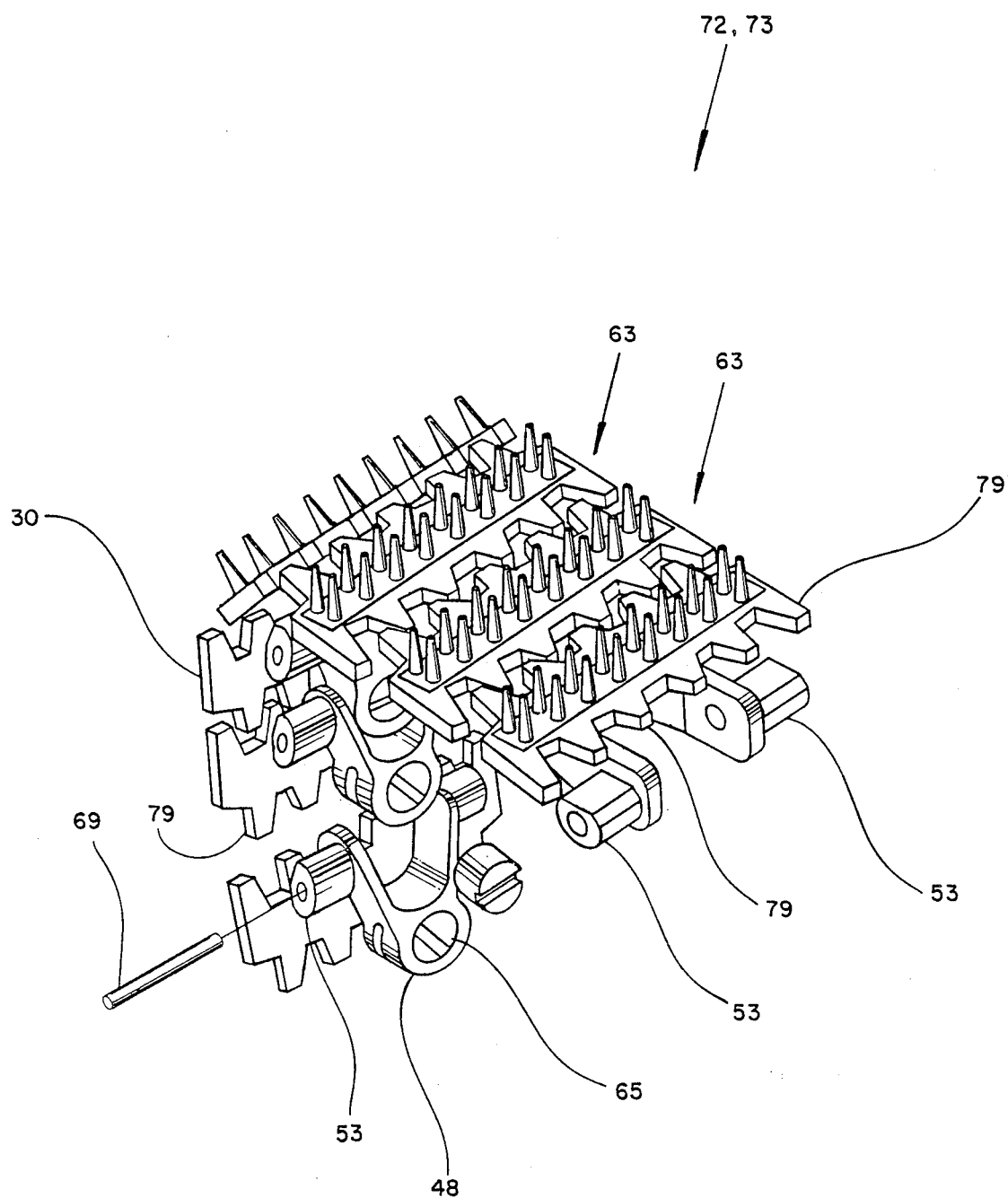
FIG. 9 is a perspective view of the continuos flexible belts used in the squeezing means of this invention.

Referring also to FIGS. 7 and 9, the adjustable compressive conveyor 12 further has a pair of revolving endless flexible conveyor chains or belts 72 and 73. The flexible chains 72 and 73 are connected to and ride on slide rails or wearstrips 52 which are attached to the conveyor beams 22. The conveyor beams 22 are rectilinear, elongated and curved at each end. Rotatable sprockets 21 and 55 having vertical axis are disposed at each curved end. The conveyor beams 22 each have a top 80 and bottom 81 portion which are separated by a spacer block 51. The separation of the top 80 and bottom 81 portions creates a channel in the sides of the beams 22 in which the belts 72 and 73 travel. The beams 22 are arranged in a side by side configuration. The spacing between the beams 22 is adjustable and dependent upon the diameter and container composition, as well as the nature and amount of product contents. The flexible chains 72 and 73 contact the sprockets 21 and 55 at the beam 22 ends and rotate around each beam 22 so that the opposing portions of each belt 72 and 73 travel in the same direction. Thus, a container 50 located between the beams 22 is squeezingly transported by the rotating belts 72 and 73.

The flexible conveyor chains or belts 72 and 73 consists of plastic universal links 63 joined together by plastic pivots 65 and stainless steel pins 69. Each link 63 consists of a generally flat and rectangular body portion 30 having opposing teeth portions 79 extending from its two long ends which mesh with adjacent links. A generally square knuckle 48 is attached to the inwardly disposed side of each body portion 31 by the rotatable pivot 65. A pair of tangs 53 are offset slightly and extend vertically from two sides of the knuckle 48. The pins 69 extend axially through the tangs 53 and join the pivot 65 of the adjacent link in a perpendicular and moveable fashion to form two axis. The links 63 of each belt 72 or 73 articulate about these two axis. The teeth of the sprockets 21 and 55 engage the tangs 53 for rotating the belts 72 and 73.

Figure 8:
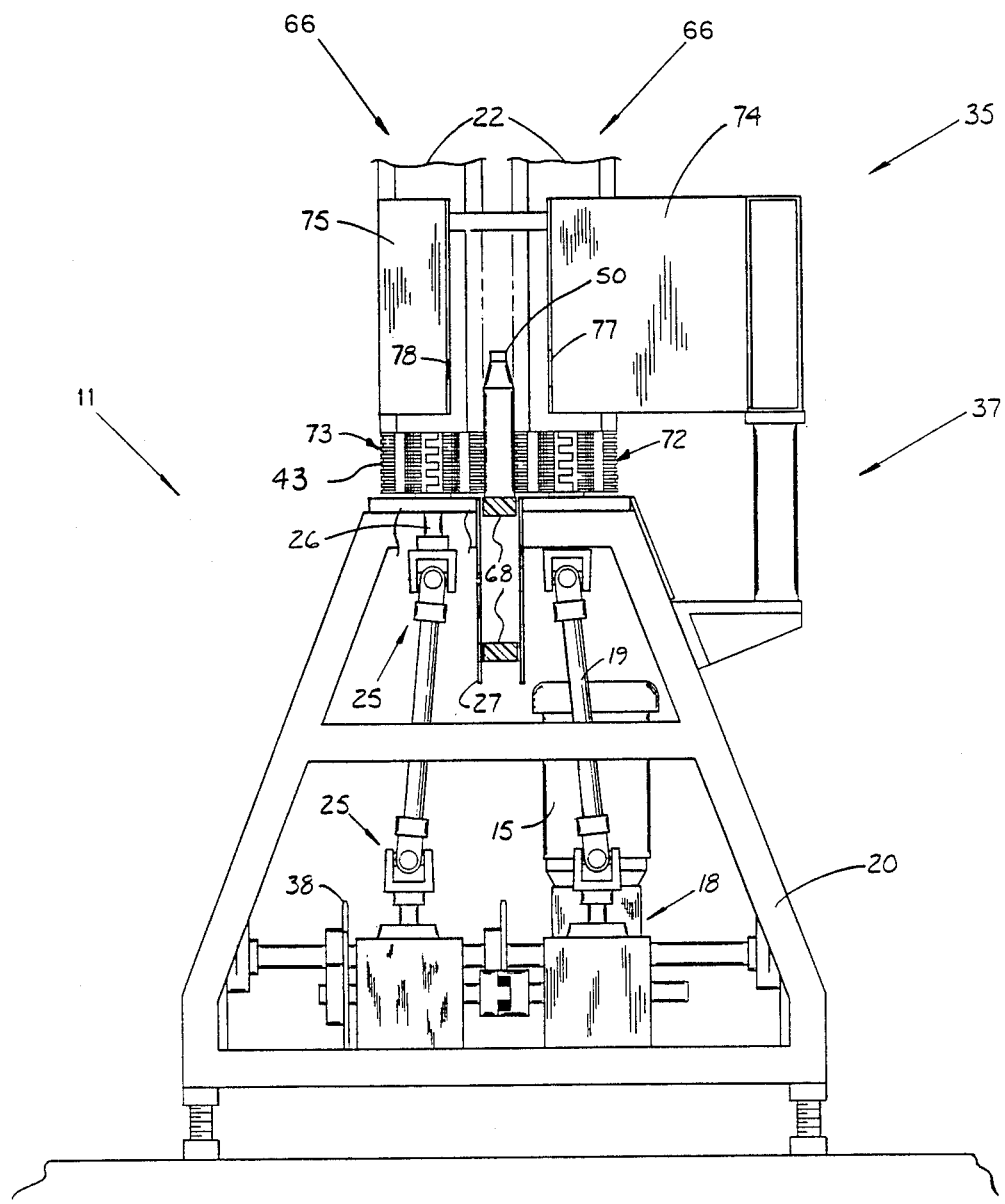
FIG. 8 is a frontal view of the mainframe and drive system of the leak detection system.

The conveyor chains 72 and 73 further have cleats 47 which grasp and squeeze the containers 50 and aid in holding the containers, particularly for vertical movement. The cleats 47 are disposed on the outwardly facing side of each body portion 30. The cleats 47 are preferably of a configuration having several rows of flexible fingers. The cleats 47 may also be of a solid and flexible configuration. FIGS. 7 and 8 show a pliable, liquid filled container 50 disposed and held between the opposing flexible chains 72 and 73.

The belts 72 and 73 are adjustable via belt adjusters 64 mounted on the elevating frame 24 (shown in FIGS. 3 and 4) to accommodate various size containers and to vary the spacing between the belts to control the external pressure on the containers 50. Horizontal mounting brackets 58 extend from two sides of the elevating frame 24. A vertical mounting bracket 45 is connected to each horizontal mounting bracket 58. The connection has a vertical adjustment slot 59 and a horizontal adjustment slot 60 to provide lateral and vertical movement in response to the belt adjusters 64. Additionally, a horizontal and slotted bracket adjuster 49 is disposed at the connection of the vertical mounting bracket 45 to the bottom portion 81 of the beams 22 for adjustment in a second horizontal plane. The support frame 24 additionally serves to support containers which may slip from the grasp of the belts 72 and 73, for example, when a container 50 has a large leak. A container guide 62 is disposed on the mainframe and drive section 11 at the termination point of the support frame 24 to also deal with any dropped defective containers.

Referring to FIGS. 3, 5 and 8, the mainframe and drive mechanism 11 is connected with a supplies driving power to the compressive transfer conveyor 12. The mainframe and drive mechanism 11 also supports one end of the line conveyor 68. The line conveyor 68 is driven by a separate, downstream power source (not shown) which is synchronized with the speed of the compressive transfer conveyor 12. The mainframe and drive section 11 consists of a frame 20, a motor 15, and connection elements to convert power from the motor 15 to the compressive transfer conveyor 12. The motor 15 is connected to a reducer and torque limiter assembly 16 which is connected via a drive chain 54 and sprocket 38 to a pair of gear assemblies 18. Each gear assembly 18 has a drive shaft 19, a pair of U-joints 25, and a head shaft 26. The U-joints 25 permit movement of the drive shafts 19 when the beams 22 are adjustably spaced. The drive shafts 19 each have a drive sprocket 21 connected to its head shaft 26. The rotatable drive sprockets 21 are connected to the conveyor beam 22 ends and engage the tangs 53 of the flexible conveyor chains 72 and 73 for rotation and movement.

Figure 4:
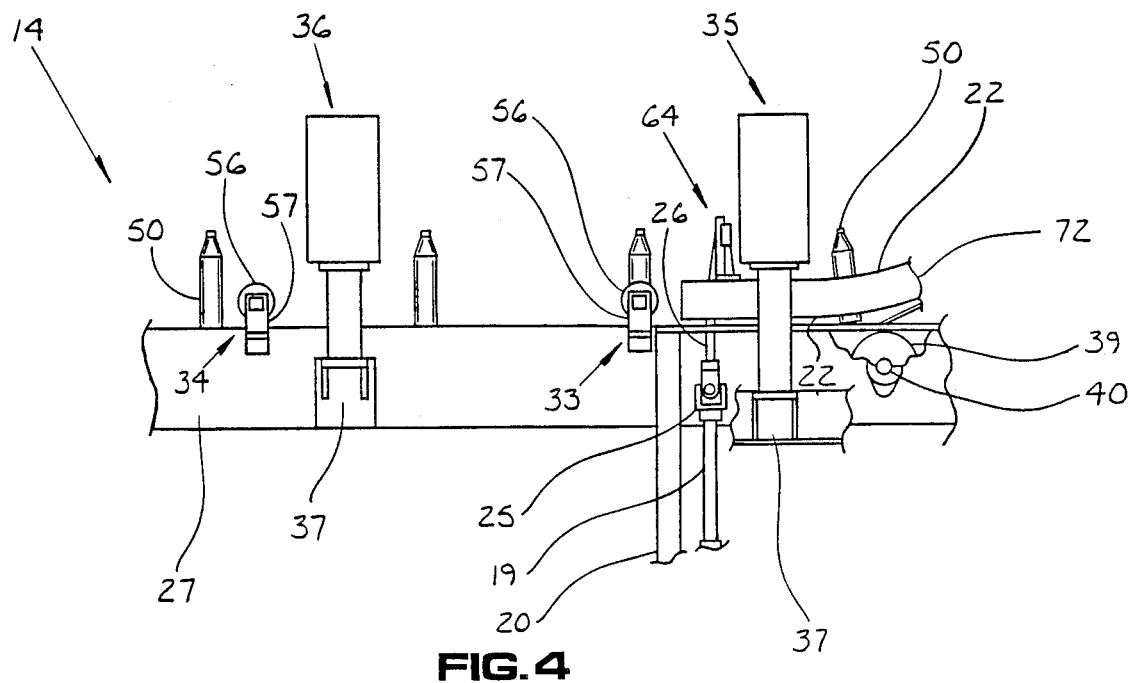
FIG. 4 is a close-up schematic lateral plan view of the embodiment of FIG. 3, showing the high level and low level container content detectors and the high and low level container rejectors.

Referring to FIGS. 3-5, the outfeed section 14 of the system 71 is extended from and aligned with the compressive transfer conveyor 12 and the mainframe and drive mechanism 11. The outfeed section 14 has a high level container content detection system 35, a high level container rejector 33, a low level container content detection system 36, a low level container rejector 34, and the outlet line conveyor 68. The line conveyor 68 has a flexible chain which rotates around a substantially horizontal axis. The line conveyor 68 chain is connected to a chain rail 28 which is supported by a conveyor side plate 27. The line conveyor 68 engages a tail sprocket 39 which is mounted on an idler shaft 40. The line conveyor 68 is driven by a separate, downstream drive mechanism (not shown). The outfeed section 14 elements are synchronized and cooperate to receive, transport and analyze containers emerging from the compressive transfer conveyor 12. The container stream is transported onto the level and uniform top surface of the line conveyor 68, which provides a suitable environment for testing container content levels.

Referring to FIGS. 4, 7 and 8, the high level container content detector 35 is comprised of a source of transmitter 75, a receiver 74 and a cross connector 76. The source 75 is disposed on one side of the compressive transfer conveyor 12 and is located above the position of the belts 72 and 73. The source 75 has a beam outlet 77. The receiver 74 is located on a support structure 37 on the opposite side of the compressive transfer conveyor 12 and in alignment with the source 75. The receiver 74 has a beam inlet portion 78. Both the source 75 and the receiver 74 are mounted on the mainframe and drive mechanism 11. The low level container content detector 36 is comprised of the same elements as the high level container content detector 35. Its source and receiver are disposed on opposite sides of the line conveyor 68 so that the beam is transmitted across the path of travel of the containers 50. An example of such container content detectors is the GAMMA 101P Fill Level Monitor manufactured by Peco Controls Corp. of Milpitaz, California. This leak detector embodiment offers high sensitivity and high reliability particularly for use with opaque and/or pigmented plastic containers. Alternatively, other fill level detectors known in the art, such as high intensity photo-eyes, infrared detectors, capacitive proximity switches, ultrasound detectors and microwave detectors, are usable with the leak detection system 71 depending upon the type of container to be tested as well as the nature of the product contents.

The high level container content detector 35 and low level container content detector 36 provide means for monitoring the fill level of the pliable containers as they are subjected to and released from the external pressure provided by the transfer conveyor 12. The high level container content detector 35 is disposed on the sides of the compressive transfer conveyor 12 at a predetermined location proximate its outlet end. The detector 35 is located at a position where the containers 50 are still under pressure or at a position immediately following the release of the external pressure. Thus, the high level container content detector 35 is positioned at a location where the containers 50 are under pressure or immediately after the release of the external pressure and have been subjected to such external pressure by the compressive transfer conveyor 12 for a predetermined length of time. The high level container content detector 35 detects elevated product content levels caused by the discharge of air and/or liquid contents through relatively small leaks while the container is under external pressure. The high level detector 35 directs a beam through a bottle neck, for example, at a predetermined height above the normal content level of a filled and sealed container under pressure. An elevated liquid level disrupts the beam to detect a leak in the container.

The low level container content detector 36 is located adjacent the line conveyor 68 at a position downstream from the compressive transfer mechanism 12 outlet end. The detector 36 is operative at a predetermined point after the container 50 has been released from the external pressure. The distance between the detector 36 and the outlet of the compressive transfer conveyor 12 is dependent upon line speed and time required for the compressed containers to recover their uncompressed shape. The low level container content detector 36 detects depressed content levels caused by the discharge of contents and subsequent intake of air through relatively larger leaks. The detector 36 directs a beam through the bottle at a level which is a predetermined distance below the normal content levels of a filled container. The lack of liquid in the normal range due to a low level thus fails to disrupt the beam to detect a relatively larger leak in the container.

The high and low level rejectors 33 and 34 are synchronized with the respective fill level detectors 35 and 36. The rejectors 33 and 34 comprise solenoid and air cylinder assemblies 46 which are mounted to the conveyor side plate 27 via mount structures 57 so that the rejectors operate perpendicularly to the direction of travel of the line conveyor 68. The air cylinders 46 have pistons 56 with a pusher face to contact the containers while they are being transported on the line conveyor 68. Actuation of either rejector 33 or 34 moves the piston outward to eject the detected leaky container from the line conveyor 68. Alternatively, other actuation means known in the art, such as air blast rejectors, are usable with the leak detection system 71. The rejectors 33 and 34 are synchronized by an internal logic and control system of the gamma-ray detectors 35 and 36. Alternatively, other conventional timing or logic means known in the art, taking into account line speed and container dimensions, may be used to synchronize the rejectors 33 and 34 with the fill level detectors.

Figure 6:
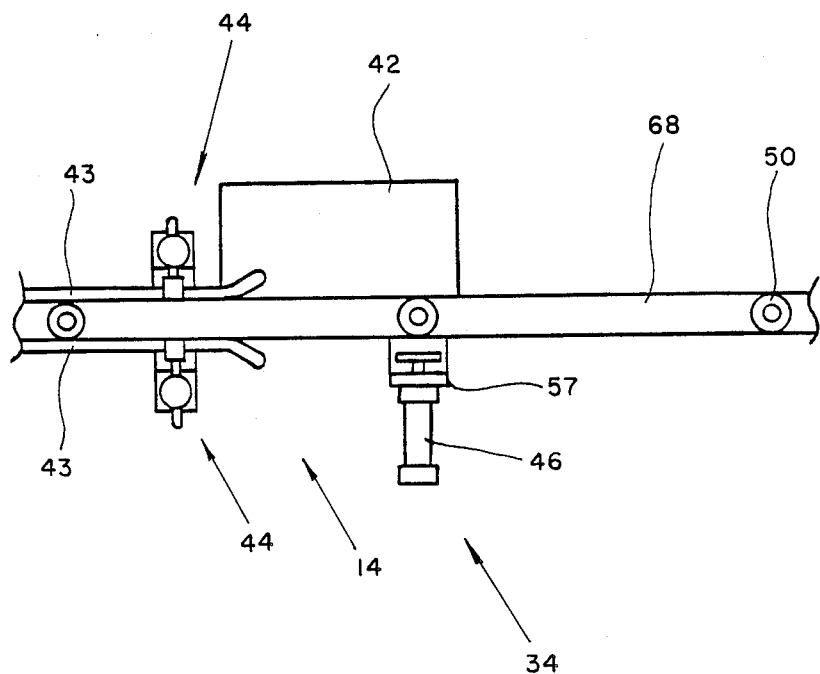
FIG. 6 is a close-up schematic top plan view of the embodiment of FIG. 5 showing the low level container rejector and reject container chute.

Referring to FIGS. 5 and 6, the outfeed section 14 further has reject container chutes and hoppers. One reject container chute 41 is shown aligned with the high level rejector 33 and disposed on the opposite side of the line conveyor 68 to receive defective containers. A reject container chute 42 is similarly aligned with the low level rejector 34. The reject container chutes 41 and 42 are preferably downwardly angled plates which extend from the conveyor side plate 27. The chutes 41 and 42 guide rejected containers to a reject container hopper or hoppers (not shown) for subsequent disposal or processing. Adjustable guide rails 43 and guide rail brackets 44 are located adjacent the line conveyor 68 downstream of the rejectors 33 and 34. The guide rails 43 serve to contain and guide the tested containers or bottles on the line conveyor 68.

In summary, the leak detection system of this invention provides a process or method for detecting leaks in each of a plurality of moving, sealed, pliable, and filled containers. The system applies a continuous and predetermined squeezing force on each moving container for a predetermined period of time. The system then detects for an increase in the fill level with respect to a predetermined norm of each moving container and then detects for a decrease in the fill level with respect to a predetermined norm of each moving container thereafter. Should any container leaks be detected, timed and cooperating ejectors are used to remove the defective containers from the moving container stream.

As many changes are possible to the embodiment of this invention, utilizing the teachings thereof, the description above and the accompanying drawings should be viewed in the illustrative and not in the limited sense.

That which is claimed is:

1. A leak detection system for filled and sealed pliable containers comprising:
   (a) continuous squeezing means, said squeezing means moving a stream of containers and further having means to place a predetermined pressure on the containers through a predetermined distance, said squeezing means having an outlet end;
   (b) conveyance means disposed in alignment and adjacent said squeezing means outlet end and being synchronized for receiving and transporting the container stream; and
   (c) fill level container content displacement detection means disposed adjacent and at predetermined locations with respect to said conveyance means to test said stream of containers for leakage, said fill level container content displacement detection means comprising an electromagnetic beam high fill-level container content detection means disposed adjacent said squeezing means outlet end and an electromagnetic beam low fill-level container content detection means disposed a predetermined distance downstream from said squeezing means and adjacent said conveyance means.

2. The leak detection system of claim 1, wherein said squeezing means is comprised of a pair of opposing and revolving endless flexible belts spaced a predetermined distance for applying said predetermined pressure to the pliable containers.

3. The leak detection system of claim 2, wherein said opposing flexible belts comprise a plurality of interconnected links and further have a plurality of outwardly extending cleat members for grasping the containers, and wherein said flexible belts are adjustable for alignment and to vary said predetermined pressure, said flexible belts having two horizontal and one vertical axis of movement.

4. The leak detection system of claim 1, wherein said continuous squeezing means is constructed and arranged in an overhead configuration having vertical and horizontal sections.

5. The leak detection system of claim 1, wherein said conveyance means is a line conveyor.

6. The leak detection system of claim 1, wherein said high fill level detection means is further located adjacent said outlet end of said squeezing means.

7. The leak detection system of claim 1, wherein said high fill-level detection means directs said electromagnetic beam a predetermined distance above the normal fill-level of the container and detects a high fill-level upon the disruption of said high level beam by container contents due to the discharge of contents from relatively small leaks in the container and wherein said low fill level detection means directs said electromagnetic beam a predetermined distance below the normal fill level of the container and detects a low fill-level upon the failure of disruption of said low level beam by container contents due to the discharge of contents from relatively large leaks in the container.

8. The leak detection system of claim 1, wherein said fill level displacement detection means comprises at least one gamma ray detector having a source and a receiver disposed on opposing sides of said stream of containers.

9. The leak detection system of claim 1, wherein said fill level displacement detection means comprises at least one photo-eye detector.

10. The leak detection system of claim 1, wherein said fill level displacement detection means comprises at least one proximity switch.

11. The leak detection system of claim 1, wherein said fill level displacement detection means comprises an ultrasound detector.

12. The leak detection system of claim 1, further comprising synchronized container reject means disposed downstream from said fill level displacement detection means and adjacent said conveyance means for removing containers therefrom in response to said fill level displacement detection means.

13. The leak detection system of claim 12, wherein said container reject means comprises a pneumatic cylinder mounted adjacent and generally perpendicular to said conveyance means, said cylinder having a piston which is extendible to laterally remove containers from said conveyance means.

14. The leak detection system of claim 12 further comprising container discharge guidance means disposed adjacent said conveyance means and opposite said container reject means to transfer rejected containers from said conveyance means.

15. The leak detection system of claim 12 further comprising container discharge receptacle means disposed adjacent said conveyance means and opposite said container reject means to accept and hold rejected containers.

16. The leak detection system of claim 1, further comprising synchronized drive means operative on said squeezing means and said conveyance means.

17. A system for detecting leaks in filled, sealed and pliable containers comprising:
 a. means for placing a predetermined pressure on the container for a predetermined period of time;
 b. means, communicatively connected to said pressure means, for detecting a high fill level of the container content during said predetermined period of time; and
 c. means, communicatively connected to said high fill level detection means, for detecting a low fill level of the container content after the elapse of a second predetermined period of time.

18. A continuous process leak detection system for filled, sealed, and pliable containers having a headspace comprising:
 a. adjustable, compressive transfer means to convey a continuous stream of spaced, individual containers at a predetermined speed and to apply a predetermined pressure on the exterior of the containers, said compressive transfer means having a pair of opposing belt members of a predetermined length, said belt members being disposed a predetermined distance from each other so that they grasp and apply a continuous squeezing force on the containers, said compressive transfer means having an inlet end and a downstream outlet end;
 b. container conveyance means disposed adjacent said outlet end of said compressive transfer means, said conveyance means being synchronized for acceptance, and further conveyance of containers from said compressive transfer means;
 c. a high level container content detector disposed adjacent and proximate the outlet end of said compressive transfer means, said high level detector being for the detection of an increase in the fill level of the pressurized containers due to discharged contents from relatively small leaks in the containers during compression;
 d. a low level container content detector disposed adjacent said conveyance means and a predetermined distance downstream from said high level container content detector, said low level container content detector being for the detection of a decrease in the fill level of the containers due to the discharge of contents from relatively large leaks in the containers and subsequent container shape recovery; and
 e. synchronized means to laterally reject containers from said conveyance means, said lateral rejection means being disposed adjacent said conveyance means and further being communicatively connected to said high and low level container content detectors and activated thereby.

19. A method for detecting leaks in each of a plurality of moving, sealed, pliable, and filled containers comprising:
 a. applying a continuous and predetermined squeezing force on each moving container for a predetermined period of time;
 b. detecting an increase in the fill level of the container content of each moving container during said predetermined period of time; and
 c. detecting a decrease in the fill level of the container content of each moving container subsequent said predetermined period of time.

* * * * *